United States Patent [19]

Gaiser

[11] Patent Number: 5,470,221

[45] Date of Patent: Nov. 28, 1995

[54] COMPACT CORE AND EJECTOR ASSEMBLY

[75] Inventor: William R. Gaiser, Spring Valley, Ohio

[73] Assignee: Broadway Companies, Inc., Dayton, Ohio

[21] Appl. No.: 217,200

[22] Filed: Mar. 23, 1994

[51] Int. Cl.[6] ................................. B29C 45/44
[52] U.S. Cl. .................. 425/556; 249/59; 249/68; 264/334; 425/572; 425/577
[58] Field of Search .................... 425/556, 577, 425/533, 537, 572; 264/334, 537; 249/59, 68

[56] References Cited

U.S. PATENT DOCUMENTS

| | | |
|---|---|---|
| 3,564,660 | 2/1971 | Darnell . |
| 3,591,898 | 7/1971 | Stenmo . |
| 3,645,492 | 2/1972 | Edlis . |
| 3,774,874 | 11/1973 | Clark ............................................ 249/68 |
| 4,126,291 | 11/1978 | Gilbert et al. ........................... 425/577 |
| 4,412,806 | 11/1983 | Gaiser et al. ........................... 425/556 |
| 4,676,474 | 6/1987 | Vallet et al. ............................. 425/556 |
| 4,832,307 | 5/1989 | Watanabe et al. ...................... 425/577 |

Primary Examiner—Tim Heitbrink
Attorney, Agent, or Firm—Thompson, Hine & Flory

[57] ABSTRACT

A compact core and ejector assembly includes an elongate core terminating in a male mold component and including a cylindrical shoulder which supports the top plate of an associated core support frame. The shoulder includes opposing, longitudinally-extending slots which receive jaw elements, which are pivotally mounted on a reciprocating knock out plate, and therefore guide the jaw elements during the ejection procedure. The top plate, knock out plate and core plate are cut away so that rows of cores may be arranged in a densely packed configuration. In a preferred embodiment, the lateral sides of the top, knock out and core plates have a cut away or sinusoidal shape so that abutting rows fit in an overlapping relationship.

15 Claims, 6 Drawing Sheets

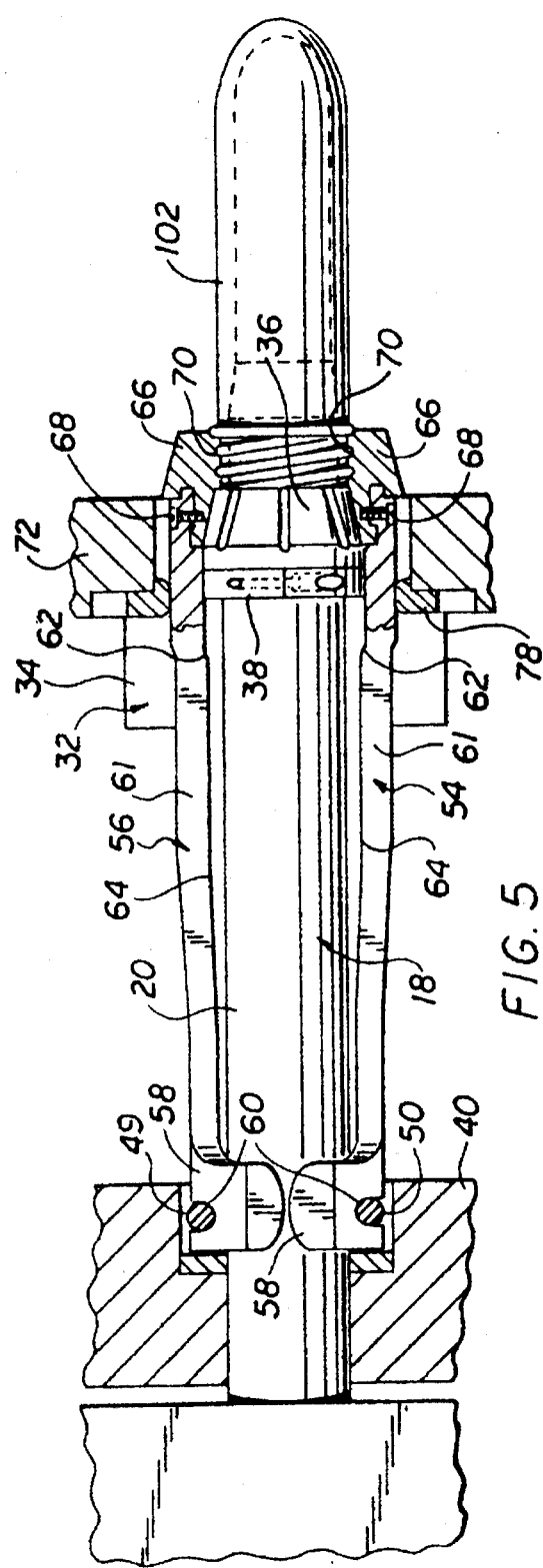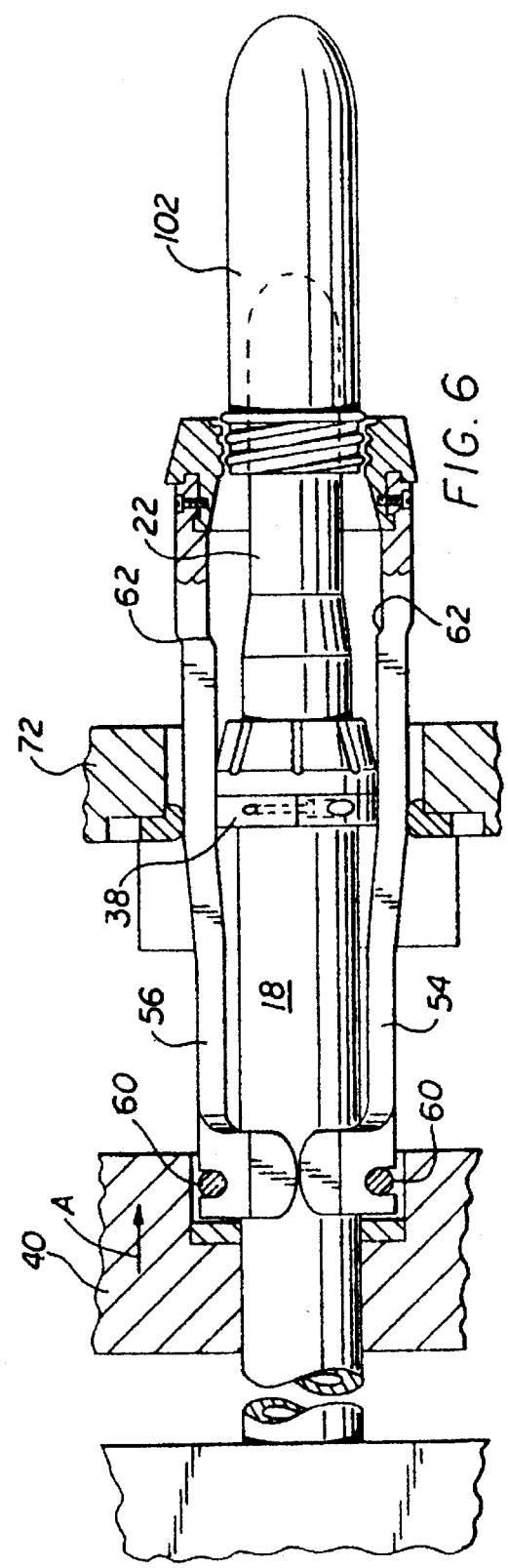

COMPACT CORE AND EJECTOR ASSEMBLY

BACKGROUND OF THE INVENTION

The present invention relates to injection molding devices and, more particularly, for injection molding devices used in continuous production of plastic preforms.

A typical device for the manufacture of preforms to be used in blow molding plastic carbonated beverage bottles is shown in Gaiser et al. U.S. Pat. No. 4,412,806 and includes an array of male mold components or cores, each having a cylindrical shape, and a corresponding array of female mold components or cavities which receive the cores and together with the cores form the preform mold. The cavities are mounted to the injection molding apparatus and are received within a cavity module having cooling channels so that, subsequent to the injection step of the process, the cores are rapidly cooled to stabilize the preforms. A typical cavity module design is shown in Gaiser et al. U.S. Pat. No. 4,395,222.

Once the injection molding and cooling/stabilization steps are completed, the cores are withdrawn from the cavities and the now stabilized preforms are ejected from the cores simultaneously. Typically, each core assembly includes a pair of reciprocating, pivotal jaws which form a portion of the female cavity, typically the threaded neck portion of the preform. The jaws are displaced relative to the cores to slide the stabilized preforms from the ends of the cores. As the jaws are displaced, they separate to release their engagement with the preforms, so that the preforms may drop downwardly to be collected in a bin or on a conveyor.

While such devices operate efficiently, there is a need to provide a given injection molding apparatus with an optimal number of cores. This optimization previously has been limited by the physical requirements of the core and ejector components themselves, which limit the number of core and jaw combinations in a given area. Accordingly, there is a need for an apparatus which maximizes the number of cores for a given area on an injection molding machine.

SUMMARY OF THE INVENTION

The present invention is a compact core and ejector assembly in which the cores are designed and arranged to be mounted on a common clamp plate of an injection molding apparatus in densely-packed arrays, each array comprising a row of cores mounted on a common top plate and core plate, and whose jaw members are actuated by a common knock out plate. The arrays are shaped such that when adjacent arrays are mounted on clamp plate in abutting relationship, the lateral sides of such abutting arrays overlap, allowing for a densely-spaced, staggered orientation of cores. This dense spacing is accomplished in part by providing the top and core plates of each array of cores with cut outs which allow nesting or interfitting of the top and core plates. In a preferred embodiment, these cutouts take the form of sinusoidal side walls on each of the top and core plates.

The individual core assemblies (comprising the core and jaw members) are also of a compact design in comparison to prior art devices. Specifically, each core includes generally cylindrical shoulder which both supports the top plate, thereby eliminating the need for additional support structure for each linear array, and includes slots which guide the jaw members associated with each core when the jaws are reciprocated and pivoted by reciprocation of the knock out plate.

Similarly, the cavity assembly of the present invention is made up of a plurality of mold cavities, each having opposing, sinusoidal side walls which allow abutting arrays to overlap.

Accordingly, it is an object of the present invention to provide a compact core and ejector assembly, and cavity assembly which permits an optimization of the number of cores which can be mounted on a clamp plate of a given size on an injection molding machine; a core ejector assembly in which the core and jaw subassemblies are of a compact and efficiently operating design; a compact core and ejection assembly which can be retrofitted onto conventional clamp plates and injection molding machines; and a core and ejector assembly which is relatively easy to fabricate, maintain and is highly reliable.

Other objects and advantages will be apparent from the following description, the accompanying drawings and the appended claims.

BRIEF DESCRIPTION OF THE DRAWINGS

FIG. 5 is a detail side elevation showing a single core assembly with the jaw members in a closed position;

FIG. 6 is the assembly of FIG. 5 in which the knock out plate is beginning its displacement towards the top plate to separate the jaw members;

DETAILED OF THE PREFERRED EMBODIMENTS

Figure 1:
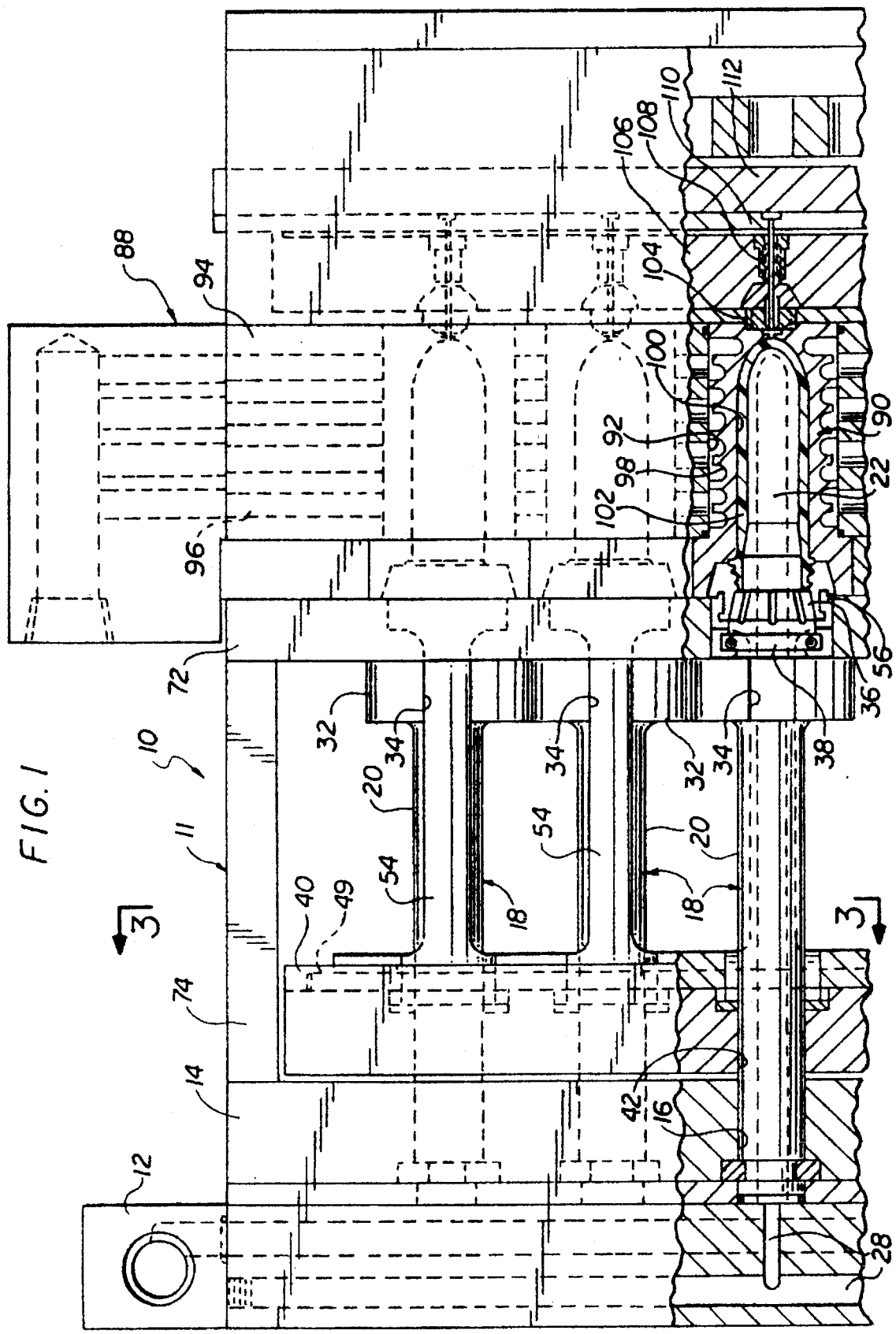
FIG. 1 is a side elevation, partially in section, of the core and cavity assemblies of an injection molding machine incorporating a preferred embodiment of the assembly of the present invention.

As shown in FIG. 1, the compact core and ejector assembly, generally designated 10, is in the form of an array 11, and is designed to be mounted on a common clamp plate 12 which is part of a typical injection molding apparatus of the type shown in Gaiser et. al. U.S. Pat. No. 4,412,806, the disclosure of which is incorporated herein by reference. Each array 11 includes a core plate 14 which is mounted on the clamp plate 12 and includes countersunk openings 16 which receive cores 18. The array 11 shown in the Figures has two rows of cores 18, arranged in staggered, offset fashion (see also FIG. 4). Each core 18 includes a cylindrical, elongate body 20 which terminates in a male mold component 22 having a conical tip 24. The body 20 includes a hollow passageway 26 which communicates with a channel 28 formed in the clamp plate 12 to receive liquid coolant, and also includes a flow divider 30 (see also FIG. 2).

Each core 18 includes a cylindrical shoulder 32 which is unitary with the body 20 and which includes a pair of opposing, axially-extending slots 34 (see also FIG. 1). A tapered neck 36 is formed on the body 20 and is positioned at the base of the male mold component 22. A cam ring 38 is removably mounted on the body 20 between the neck 36 and shoulder 32.

Figure 2:
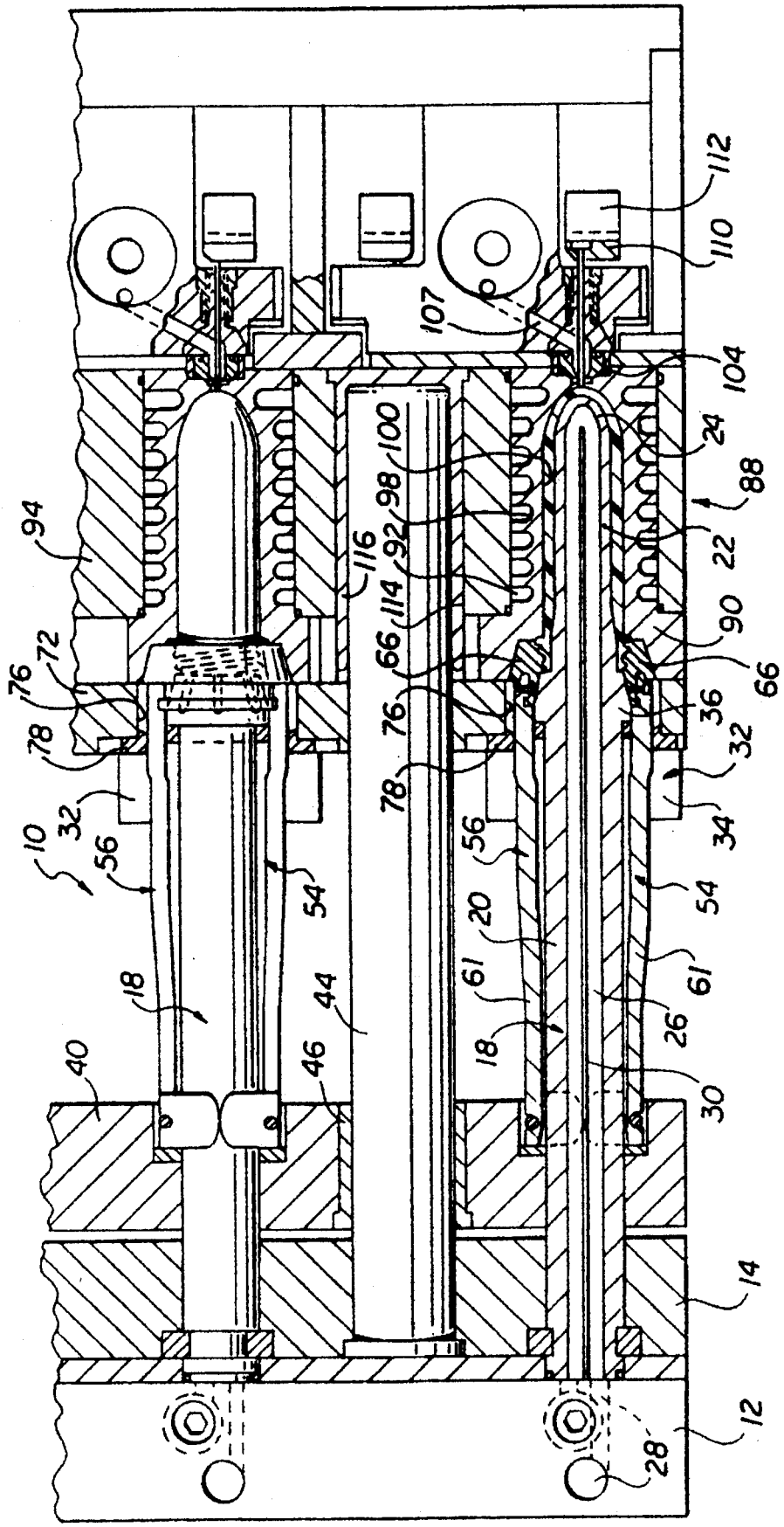
FIG. 2 is a detail of the core assembly of FIG. 1, showing core and cavity assemblies in full and in section.
Figures 3, 4:
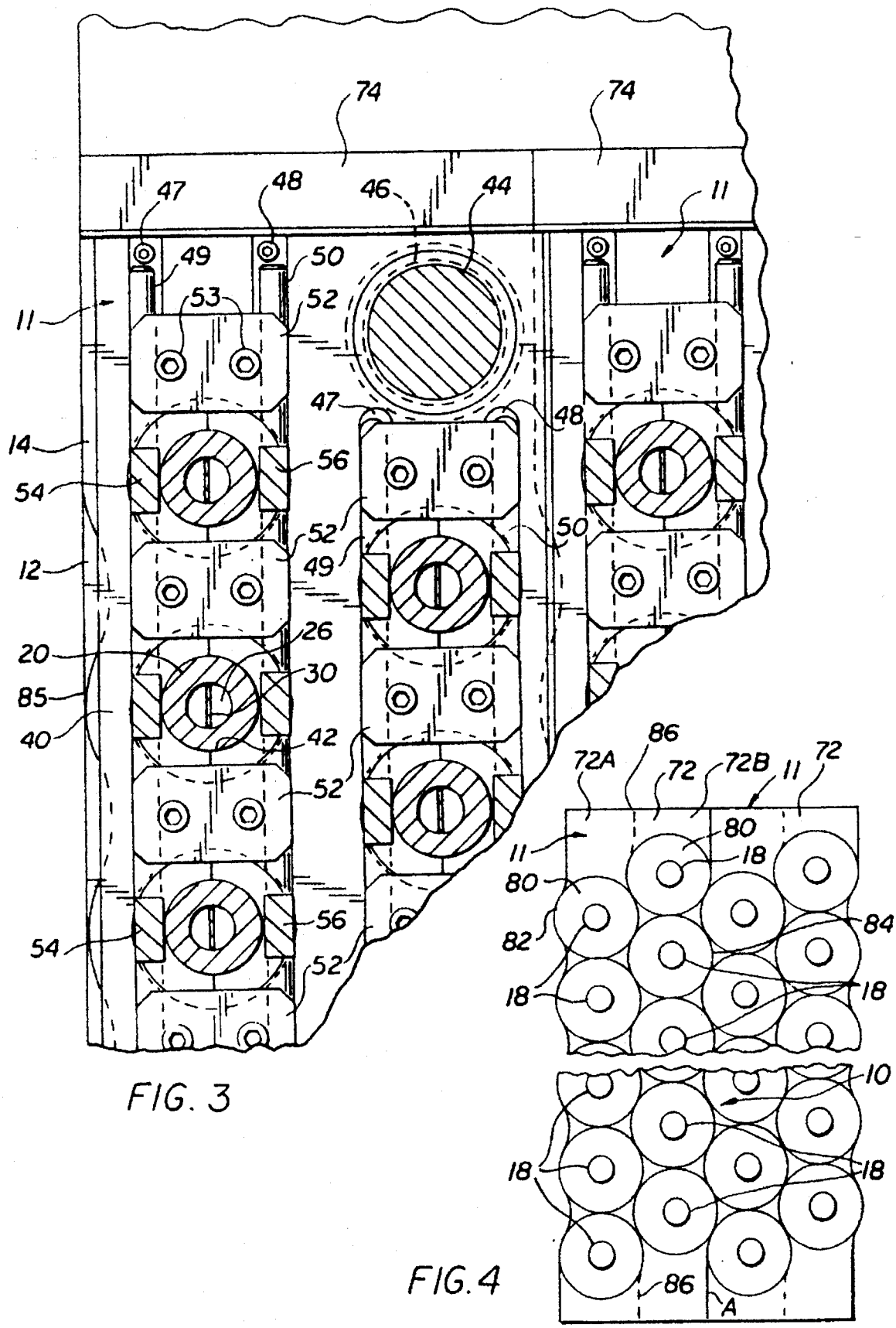
FIG. 3 is a plan view taken at line 3—3 of FIG. 1.
FIG. 4 is a schematic representation of an array of core assemblies of the preferred embodiment of FIG. 1.

Each array 11 includes a knockout plate 40 positioned adjacent to the core plate 14 and which includes openings 42 through which the core bodies 20 extend. As shown in FIGS. 2 and 3, the core plate 14 supports cylindrical guides 44 which are positioned at the ends of the core plate and extend through bushings 46 mounted in and extending through the knock out plate 40. These guides 44 control the travel of the knock out plate in the direction toward and away from the core plate 14 during the preform ejection procedure, which will be described later. As shown in FIG. 3, the knock out plate 40 includes pairs of transversely extending slots 47, 48 which receive rods 49, 50. The rods 49, 50 are retained in the slots 47, 48 by retainer plates 52, which are spaced along the knock out plate in between the cores 20 and retained by screws 53. The rods 49, 50 act as pivot pins for pairs of jaws 54, 56 (see also FIGS. 1 and 2), which are identical to each other in shape.

As shown in FIG. 5, each of the jaws 54, 56 includes base portion 58 which is arcuately shaped to conform to the cylindrical shape of the core body 20 with which they are associated, and which include notches 60 to receive the pins 49, 50, respectively, about which the jaws pivot. The jaws also include shanks 61 which pass through slots 34 of the shoulders 32 and include offsets 62, positioned near the cam ring 38 on the core body, and a second, gradual offsets 64 positioned midway between the offsets 62 and the base portions 58. The ends of the jaws 54, 56 include semicircular, frustonical tips 66 which are retained on the ends of the jaws by screws 68 and which include inner peripheries 70 having thread groovers formed thereon. The tips 66 are positioned to engage the neck 36 of a core 18 when in a closed position as shown in FIG. 5.

As shown in FIGS. 1 and 2, each array 11 of the assembly 10 includes a top plate or "B plate" 72 which is joined to the core plate 14 by end walls 74 (see also FIG. 3). The top plate 72 includes openings 76 through which the cores 18 extend. The openings 76 are countersunk to receive cam rings 78 which engage the jaws 54, 56 when held in the closed position as shown in FIGS. 1 and 2. The top plate 72 abuts and therefore is supported by the shoulders 32 of the cores 18 during the injection molding procedure. The presence of the shoulders 32 on the cores enables to cores to perform multiple duties; that is, in addition to forming the male portion of the preform mold, the cores help support the top plate in between the end plates 74 of an array 11 and guide the jaws 54, 56 which extend through the slots 34 and through the top plate 72 (see also FIG. 5).

As shown in FIG. 4, the array 11 of core assembly combinations (each consisting of a core 18 and jaws 54, 56), shown schematically as circles 80, are arranged on the top plate 72 in staggered, offset fashion. The top plate 72 includes lateral side walls 82, 84 which are cut away to have sinusoidal shapes. The core plate 14 (see FIG. 3) also includes opposing, sinusoidal side walls 85. Accordingly, arrays 11 can be placed in abutting relation, as shown in FIG. 4, such that the sinusoidal side walls 82, 84, 85 of the top plates 72 and core plates 14 engage and overlap along line A.

The arrangement of assemblies 80 on a single top plate 72 may be considered an array 11, in which the top plate 72 may include two linear nested rows of assemblies 80 as shown, or alternately may include a single linear array of assemblies 80, such as subarrays 72A and 72B, in which case the subarrays would be joined at phantom line 86 to form the same offset, nested arrangement as for line A. The use of the cut away or sinusoidal side walls 82, 84, 85 allows the ejector assembly 10, which comprises the core plate 14, top plate 72, ejector plate 40, cores 18 and jaws 54, 56, to be arranged on the clamp plate 12 of an ejection molding machine in a dense, closely-packed orientation, so that adjacent arrays 11 which abut each other have overlapping top plates 72 and core plates 14. The ejector plate 40 is narrower in width, and therefore does not necessarily need to be similarly shaped. However, it would be within the scope of the invention to provide ejector plates 40 with a similar sinusoidal side wall shape.

As shown in FIGS. 1 and 2, the compact core and ejector assembly 10 is shaped to engage a similarly densely arranged cavity array, generally designated 88. The cavity array 88 includes a plurality of individual cavity elements, generally designated 90, which are received within cylindrical recesses 92 formed in the cavity block 94. The cavity block 94 is formed with a plurality of channels 96 for conveying coolant through the cavity block 94 and around the cavity elements 90. The cavity elements 90 include outer walls 98 having annular recesses for promoting circulation of coolant. The inner wall 100 of each cavity element 90 is shaped to conform to the outer contour of the preform 102 to be formed, just as the male mold component 22 is shaped to conform to the inner contour of the preform 102.

Each cavity element 90 is connected to a sprue 104 which, in turn, communicates with a sprue plate 106. Liquid plastic material is injected through channels 107 shown in the sprue plate 106, through the sprue 104 and into the individual cavity elements. Pins 108 extend through the sprues 104 and are mounted on a pin plate 110 which is attached to a pin support plate 112. Pin support plate 112 and pin plate 110 are reciprocated to cause pin 108 within the sprue 104 to alternatively open and close the flow of plastic material into the cavity element 90. It is within the scope of the invention to utilize a conventional sprue design, such as that shown in Gaiser et. al. U.S. Pat. No. 4,395,222, the disclosure of which is incorporated herein by reference.

As shown in FIG. 2, the cavity block 94 includes a recess 114 which receives a sleeve 116 shaped to receive the guide 44 mounted in the core plate 14. The engagement of the guide 44 and core plate 94 helps to guide the travel of the assembly 10 during an injection molding procedure, and provides a stop to prevent damage to components.

Figure 9:
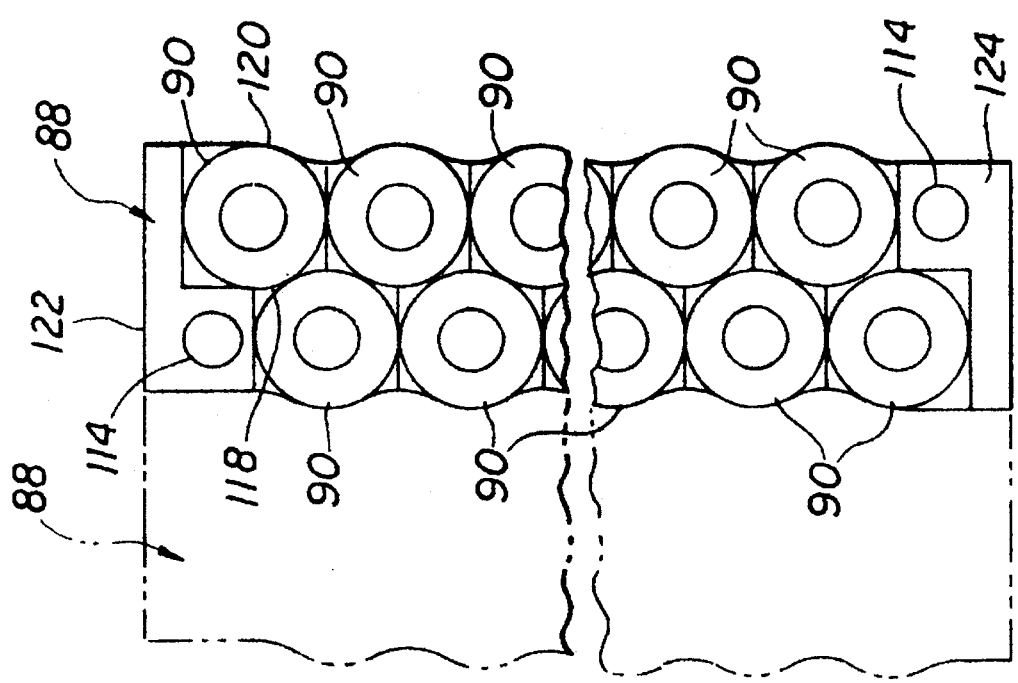
FIG. 9 is a schematic representation of an array of cavity assemblies of the embodiment of FIG. 1.

As shown in FIG. 9, the cavity array 88 preferably includes a plurality of cavity elements 90, each of which has rounded side walls 118, 120 which allow the individual cavity elements 90 to be stacked in dense, offset, overlapping arrays as shown. L-shaped plates 122, 124 each include a recess 114 for receiving the guides 44 associated with the core assembly 10. As with assembly 10, the cavity array 88 may also take the form of a single row of cavity elements 90, and such rows can be ganged together to form arrays 88, 88 of varying sizes, as illustrated in FIG. 9. Similarly, cavity block 94 is two rows of cavity elements 10 wide, and has the same lateral contour as sides 118, 120, to allow the placement of a number of arrays 88 and cavity blocks 94.

Figure 7:
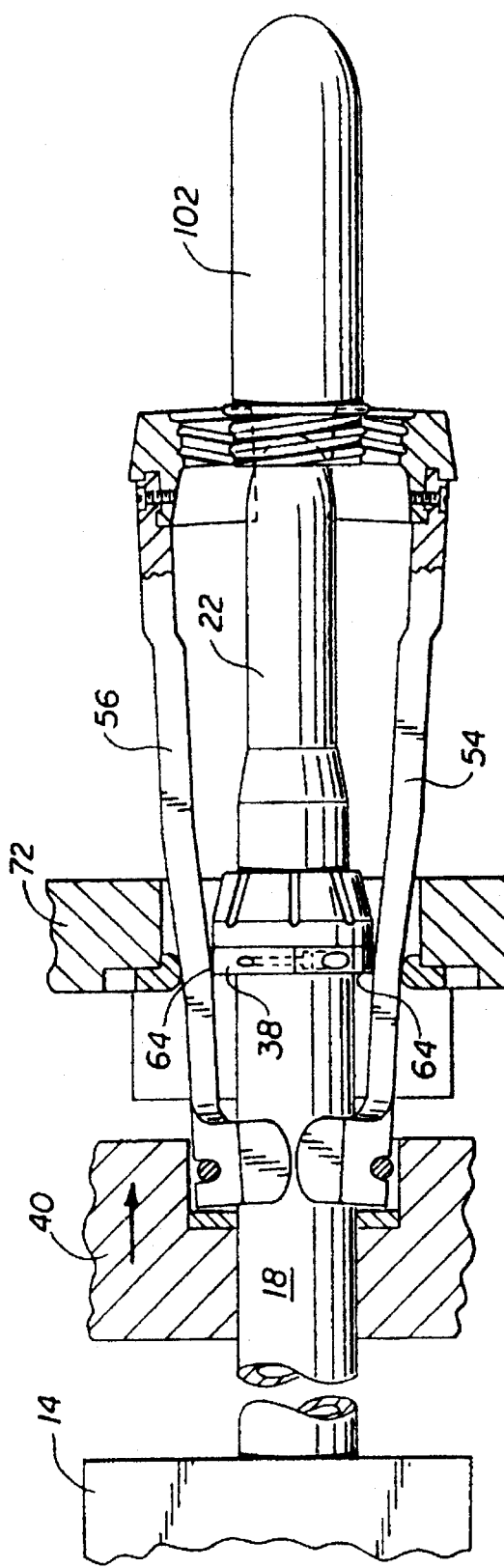
FIG. 7 is the core assembly of FIG. 5 in which the knock out plate has been displaced to open the jaw members completely to eject a finished preform.
Figure 8:
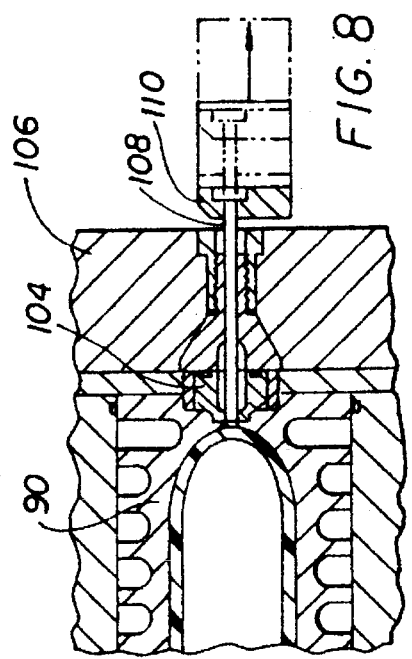
FIG. 8 is a detail showing the mold feed mechanism of the cavity assembly of the preferred embodiment of FIG. 1.

The sequence of operation is shown in FIGS. 5, 6 and 7 and is as follows. Initially, the jaws 54, 56 are in a closed position as shown in FIG. 5, and are held in that position by engagement of the outer surfaces of the jaws with the camming ring 78. The core 20 and associated assembly 10 are positioned within the cavity array 88 as shown in FIG.

2, wherein the male mold components 22 are each positioned within an associated, complementary female mold component or cavity block 90. When in this position, the space between the male mold component 22 and inner wall 100 defines the shape of the preform 102 to be formed, and as noted earlier, the jaw tips form the threaded top and a portion of the neck of the finished preform.

When in the configuration shown in FIG. 2, heated liquid plastic material, such as polyethylene terephthlate, is injected through sprue 104 into the cavity of the cavity element 90 and immediately begins to chill due to the relatively cool temperatures of the cooled core body 20 and cooled cavity element. At this point, the assembly 10 is separated from the cavity array 88, and the preform 102 is exposed to the ambient, as shown in FIG. 5. After a predetermined interval, which may be in the order of a fraction of second, the knockout plate 40 is displaced in the direction of arrow A toward the top plate 72 by a double-acting hydraulic cylinder (not shown). As the knockout plate 40 is displaced in this direction, the jaws slide against ring 38, which splits the jaws 54, 56. When the ring 38 encounters offset 62 in jaws 54, 56 the jaws are initially split apart from their locked position shown in FIG. 5. However, the jaws 54, 56 still engage the preform 102 sufficiently to displace the preform off of the mold component 22.

As shown in FIG. 7, as the knockout plate continues to travel toward the top plate 72, the inner camming surfaces of the jaws 54, 56 continue to contact the ring 38, which causes the jaws to continue to pivot apart from each other. When the second offset 64 of jaws 54, 56 encounters the camming ring 38, the jaws are split apart further, to release entirely from engagement with preform 102. At this point, the preform 102 is free to fall downwardly under the force of gravity to be collected in a bin or accumulate on a conveyor to be transported away from the associated injection molding apparatus. Consequently, the jaws 54, 56 each include a camming surface which extends substantially the length of the jaw, and extends in a circumferential direction, relative to a central axis of the associated core 18.

With the assembly 10 and cavity array 88 as shown in the accompanying figures, a clamp plate of given dimensions can support a greater number of cores 20 than with prior art devices, such as that shown in Gaiser et. al. U.S. Pat. No. 4,412,806. Similarly, with the cavity array shown in FIGS. 2 and 9, a greater number of mold cavities can be mounted on an injection molding machine of given dimensions. Further, the modular shape of the cavity elements 90 allows them to be arranged in arrays of a single row, a double row, or multiple rows, without modification of the components of the cavity array 88.

While the forms of apparatus herein described constitute preferred embodiments of the invention, it is to be understood that the invention is not limited to these precise forms of apparatus, and that changes may be made therein without departing form the scope of the invention.

What is claimed is:

1. A compact core and ejector assembly for use with an injection molding apparatus comprising:

elongate core means for a mold, said core means terminating in a male mold component and including a shoulder supporting a top plate of an associated support frame and;

jaw means forming portion of a female mold component for gripping a preform molded on said core means.

2. A compact core and ejector assembly for use with an injection molding apparatus comprising:

elongate core means, said core means terminating in a male mold component and including a shoulder for supporting a top plate of an associated support frame;

jaw means forming a portion of a female mold component and for gripping a preform molded on said core means;

top plate means for receiving a row of said core means and for supporting said jaw means associated with said row of core means in a closed configuration, said top plate means being shaped to allow a staggered, nested spacing of said core means between adjacent rows of said core means in adjacent said top plate means.

3. The compact core and ejector assembly of claim 2 wherein said top plate means is cut away in width between adjacent core means in a row thereof such that abutting one of said plate means overlap.

4. The compact core and ejector assembly of claim 3 wherein said top plate means has sinusoidal longitudinal sides.

5. The compact core and ejector assembly of claim 2 wherein said shoulder includes a slot for guiding said jaw means.

6. The compact core and ejector assembly of claim 2 wherein said jaw means includes a longitudinally-extending camming surface oriented circumferentially relative to said core, and said core means includes circumferentially-extending cam means for contacting and imparting movement to said jaw means, said jaw means being shaped to split apart when displaced longitudinally relative to said cam means toward said male mold component to displace a preform from said core means and release said preform from said jaw means.

7. The compact core and ejector assembly of claim 6 wherein said cam means includes a removable ring mounted on said core means.

8. The compact core and ejector assembly of claim 2 further comprising knock out plate means for receiving said jaw means in a pivot connection, said knock out plate means being reciprocatable relative to said top plate means and shaped correspondingly thereto to allow said nested configuration.

9. A compact core and ejector assembly comprising:

core means forming a male component of a preform mold;

core plate means for supporting a row of a plurality of said core means;

jaw means, associated with said core means, for forming a portion of a female mold of said preform;

knockout plate means for supporting said jaw means for pivotal movement relative to said core means and being reciprocatable relative to said core plate means; and top plate means for supporting said jaw means in a closed configuration about said core means;

said core plate means and top plate means being shaped to allow overlapping engagement between said core plate means and top plate means of adjacent rows of said core means, whereby a number of core means positionable in a predetermined area is maximized.

10. The compact core and ejector assembly of claim 9 wherein said core means includes a shoulder for supporting said top plate means of an associated support frame.

11. The compact core and ejector assembly of claim 10 wherein said top plate means is cut away in width between adjacent core means in a row thereof such that abutting top plate means overlap.

12. The compact core and ejector assembly of claim 11 wherein said top plate means has sinusoidal longitudinal sides.

13. The compact core and ejector assembly of claim 12 wherein said shoulder includes a slot for guiding said jaw means.

14. The compact core and ejector assembly of claim 13 wherein said jaw means includes a longitudinally-extending camming surface oriented circumferentially relative to said core, and said core means includes circumferentially-extending cam means, said jaw means being shaped to split apart when displaced longitudinally relative to said cam means toward said male mold component to displace a preform from said core means and release said preform from said jaw means.

15. The compact core and ejector assembly of claim 14 wherein said cam means includes a removable ring mounted on said core means.

* * * * *